Oct. 27, 1953  J. W. COX ET AL  2,656,776
TRACTOR LIFT AND HITCH STRUCTURE
Filed April 12, 1951  2 Sheets-Sheet 1

INVENTORS
John W. Cox and
Lewis M. Cox
BY
Fishburn & Mullendore
ATTORNEYS

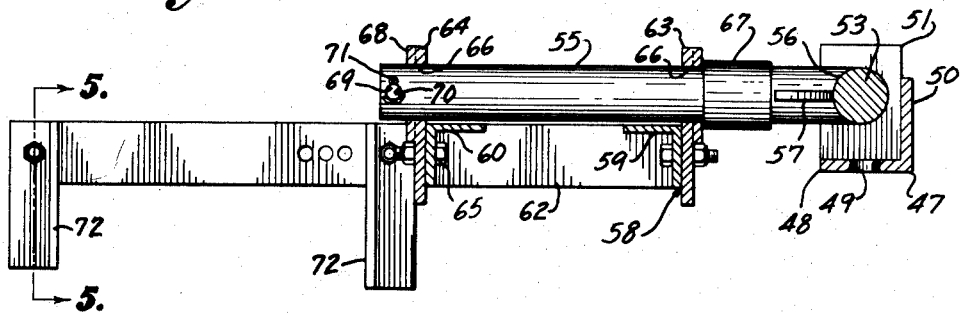
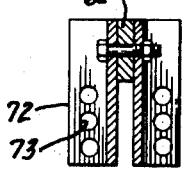
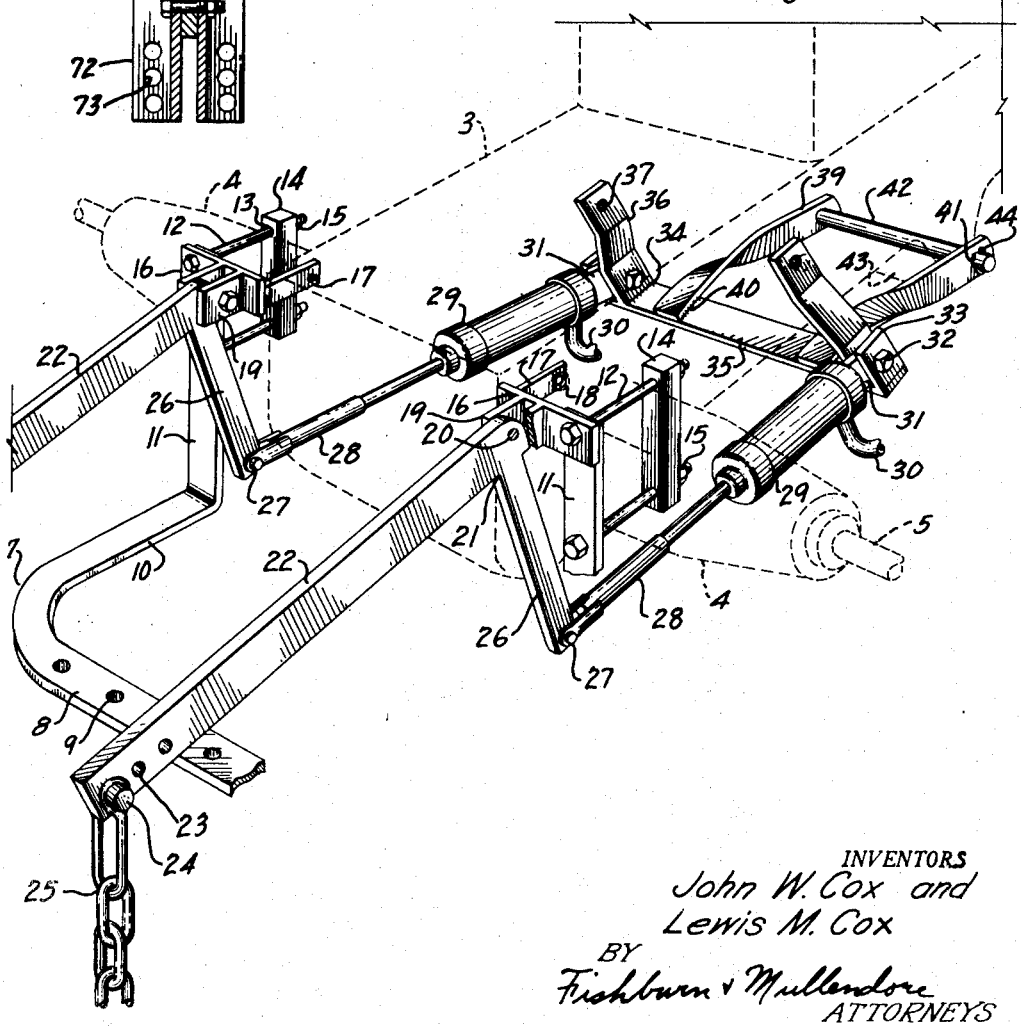

Patented Oct. 27, 1953

2,656,776

UNITED STATES PATENT OFFICE 2,656,776

TRACTOR LIFT AND HITCH STRUCTURE

John W. Cox and Lewis M. Cox,
Daviess County, Mo.

Application April 12, 1951, Serial No. 220,664

3 Claims. (Cl. 97—46.35)

1

This invention relates to tractor lift and hitch structures and more particularly to a hitch and lift mechanism for use in conjunction with agricultural implements such as corn planters and the like.

The principal objects of the invention are to provide a hitch having pivotal connection with a tractor drawbar for swinging movement about axes arranged longitudinally and tranversely of the tractor; to provide such a pivotally connected hitch having a plurality of spaced, rigid connections with an implement to be drawn by the tractor to maintain the implement in trailing alignment with the tractor; to provide lift mechanism on the tractor with a plurality of connections to the hitch and/or implement for lifting the implement by swinging same about the transverse pivotal axis of the hitch; to provide pivotally mounted lift arms and hydraulic cylinders or jack attachments on a tractor for lifting the hitch and implement while negotiating turns and during transportation of the implement to an area to be worked; to provide flexible connections between the lift mechanism and hitch and/or implement; to provide a hitch that holds the implement in line with the tractor yet allows said implement to follow the contour variations of the surface; and to provide a tractor lift and hitch which is economical to manufacture, of sturdy construction, that may be easily mounted on or removed from the tractor and implement, and is positive in the control thereof.

In accomplishing these and other objects of the present invention, we have provided improved details of structure, the preferred forms of which are illustrated in the accompanying drawings wherein:

Fig. 4 is a vertical sectional view through the hitch structure on the line 4—4, Fig. 2.

Fig. 5 is a vertical sectional view through the hitch on the line 5—5, Fig. 4.

Fig. 6 is a perspective view of the lift mechanism, the rear portion of the tractor being shown in dotted lines.

Figure 1:
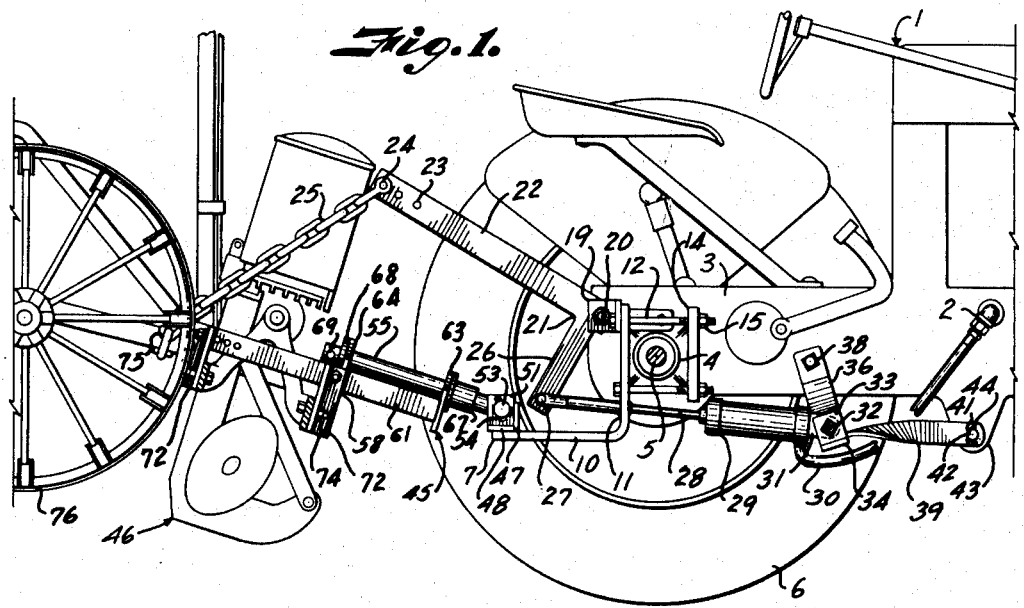
Fig. 1 is a side elevation of the hitch and lift structure applied to a tractor and implement showing the implement in raised position, one wheel of the tractor being removed to better illustrate the hitch and lift mechanism.

Referring more in detail to the drawings:

I designates a tractor having a hydraulic pump

2 and valve structure (not shown) for selectively applying liquid under pressure to a connection 2 arranged exteriorly of the tractor housing 3, said valve also controlling return flow of liquid to a reservoir (not shown). The housing 3 encloses the usual transmission mechanism and has laterally extending bearing members 4 for supporting the rear axle 5 which carries conventional wheels 6. A drawbar 7 extends rearwardly from the tractor housing 3, the drawbar consisting of a transverse member 8 having a plurality of spaced apertures 9 therein. The ends of the transverse member 8 are provided with forwardly extending arms 10 which terminate in upwardly extending members 11 adapted to engage the rear of the bearing members 4 on each side of the housing 3. The drawbar is secured to the tractor, for example, by means of bolts 12 which extend through apertures in the members 11 and straddle the bearings 4. The threaded shanks of said bolts extend through apertures 13 in plates 14 whereby nuts 15 on the threaded shanks draw the plates 14 and members 11 securely against the bearing members 4 to form a rigid mounting for the drawbar.

Brackets 16 are arranged at the upper ends of the members 11 and are held thereon by means of the bolts 12, said brackets also having ears 17 which extend alongside the housing 3 and are preferably suitably secured thereto by means of screws 18. Each of the brackets 16 has a rearwardly extending pair of ears 19 suitably mounting pins 20 which pivotally mount bell crank members 21 whereby said bell cranks may be swung in spaced parallel, vertical planes. The bell cranks include rearwardly extending lifting arms 22, having a plurality of spaced apertures 23 adjacent the rear ends thereof for receiving bolts 24 which pivotally connect the rear ends of the lifting arms with flexible members, such as chains 25, for connection with a farm implement and/or hitch therefor as later described. The bell cranks also include depending arms 26, the lower ends of which are pivotally connected as at 27 with the rear ends of rods 28 which are moved by hydraulic pressure in hydraulic cylinders or jacks 29, the forward ends of said cylinders having hydraulic liquid ducts 30 connected to the liquid connection 2 for providing communication of the cylinders with the pump and valve arrangement in the tractor.

The forward ends of the cylinders 29 are provided with ears 31 pivotally mounted on pins 32 supported by ears 33 of a bracket 34. The bracket 34 includes a bar 35 which extends transversely and under the housing 3. The bracket also has extensions on certain of the ears 33 which extend upwardly and inwardly to engage the sides of the housing 3, said extensions having apertures 37 for receiving screws 38 to secure the extensions to the housing. Forwardly extending, twisted arms 39 are secured as at 40 to the bar 35, the forward ends of the arms 39 being provided with apertures 41 for receiving a pin 42 which extends through depending ears 43 on the housing 3, as illustrated in Fig. 1, the pin 42 being retained in assembled relation by suitable fastening devices such as cotter pins 44. With this arrangement the pin 42 and arms 39 serve as rigid braces which cooperate with the extensions 36 and screws 38 to provide a substantially rigid mounting for the forward ends of the cylinders 29, whereby fluid pressure supplied to the cylinders will move the rods 28 rearwardly to swing the bell cranks and effect lifting motion of the lifting arms 22. Operation of the valve (not shown) in the hydraulic system of the tractor to release the pressure in the cylinders will permit the weight on the lifting arms 22 to force the liquid from the cylinders through the ducts 30 and connection 2, allowing the arms 22 to move to a lower position.

The hitch 45 for connecting an implement such as a corn planter 46 to the tractor consists of an angle-shaped member 47 arranged transversely of the tractor with the horizontal flange 48 resting on the transverse member 8 of the drawbar with apertures 49 in the flange 48 aligning with apertures 9 in the transverse member 8 for receiving suitable fastening devices to rigidly connect the angle member to the drawbar. The vertical flange 50 extends upwardly from the forward edge of the flange 48. Ears 51 are suitably arranged adjacent the ends of the angle member 47 and are provided with apertures 52 for rotatably mounting the ends of a shaft 53, said shaft being retained in position by means of fastening devices such as cotter pins 54. This mounting of the shaft 53 is such that the axis thereof is transversely of the tractor and substantially horizontal. A shaft 55 is arranged perpendicular to the shaft 53 and has its forward end suitably secured thereto as at 56 at the mid point thereof. Suitable gusset plates 57 are secured to the respective shafts to reinforce the connection thereof. The shaft 55 extends rearwardly of the drawbar and is swingable in a vertical plane about the axis of the shaft 53.

Figure 2:
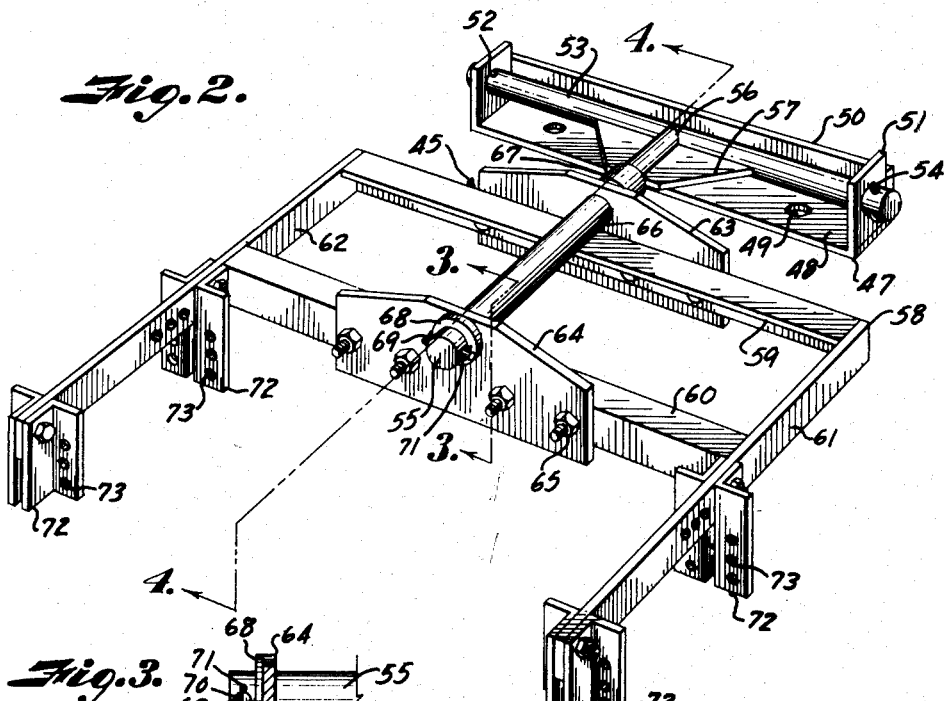
Fig. 2 is a perspective view of the hitch structure.
Figure 3:
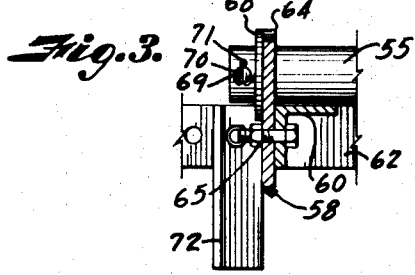
Fig. 3 is a vertical sectional view through the hitch structure on the line 3—3, Fig. 2.

A frame 58, has spaced transverse members 59 and 60 illustrated as being angular in cross-section and spaced longitudinal members 61 and 62 suitably secured to the ends of the transverse members, said longitudinal members extending rearwardly from the rearmost transverse member as illustrated in Fig. 2. Bearing members 63 and 64 are suitably secured to the transverse members 59 and 60 respectively by suitable fastening devices, such as bolts and nuts 65, said bearing members extending above the transverse members and having apertures 66 therein arranged on the longitudinal center of the frame 58 for rotatably mounting the frame on the shaft 55. A collar 67 is secured to the shaft 55 at the rear of the gusset plates 57 and is adapted to be engaged by the bearing member 63 to limit forward movement of the frame. A washer 68 is sleeved over the shaft 55 and engages the bearing member 64, cooperating with a pin 69 arranged in an aperture 70 at the rear end of the shaft 55 for retaining the frame on the shaft, the collar 67 and pin 69 cooperating to limit the longitudinal movement of the frame 58. The pin 69 is held in assembled condition by suitable fastening devices such as cotter pins 71. The rearward portions of the longitudinal members 61 and 62 are provided with a plurality of angular brackets 72, having apertures 73 therein adapted to receive fastening devices 74 for securing the implement, such as a corn planter, to the frame, the spacing of the angular brackets being such as to align with cooperating brackets on the implement whereby the frame is secured rigidly thereto.

The flexible members 25 have their ends connected to the implement frame as at 75, whereby upward movement of the lifting arms 22 swings the implement upwardly about the axis of the shaft 53. When the lifting arms are in lowered position to permit the engagement of wheels 76 of the implement on the ground, the flexible members are preferably slack whereby the implement and frame may rock about the axis of the shaft 55 to permit the implement to follow the contour of the ground.

In using a device constructed and assembled as described, the tractor engine is started, thereby operating the hydraulic pump therein. The valve mechanism is then actuated whereby the pump supplies liquid under pressure through the connection 2 and ducts 30 to the cylinders 29. The hydraulic pressure causes the rods 28 to be moved rearwardly, swinging the bell cranks 21 on the pins 20 to move the lifting arms 22 upwardly whereby the flexible members 25 raise the implement from the ground, swinging said implement about the axis of the shaft 53. While the implement is in raised position the tractor is moved to the area to be worked. Then the valve is actuated to release the pressure in the cylinders 29, whereby the weight of the implement will cause the arms 22 to swing downwardly, moving the rods 28 forwardly forcing the liquid from the cylinders 29, thereby permitting lowering of the implement to effect engagement of the wheels 36 with the ground. The tractor is then operated to draw the implement over the area to be worked. When it is necessary to turn the tractor, the hydraulic mechanism is again actuated to raise the implement during the turning movement. After the turn is completed the implement is again lowered to the ground and drawn over the area to be worked. Due to the rigid connection of the frame 58 with the implement and the arrangement of the shafts 53 and 55, the implement is held in trailing alignment with the tractor, the only movement of the implement during operation thereof being rocking action about the axis of the shaft 55 in the movement of the implement over uneven ground. When work with the particular implement is finished, it may be disconnected from the brackets 72 and the hitch connected to other implements, or the hitch may be disconnected from the drawbar and left attached to the implement during other use of the tractor. The entire mechanism may be easily assembled on the tractor and implements without material alteration thereof, it ordinarily being necessary only to provide threaded apertures in the housing 3 for receiving the screws 18 and 38.

It is believed obvious that we have provided a lift and hitch structure which is economical to manufacture, easily mounted on the tractor and implement and efficient in operation.

What we claim and desire to secure by Letters Patent is:

1. In combination with a tractor having a hydraulic pressure supply and means for controlling same, of a drawbar extending substantially transversely rearwardly of the tractor, a rockshaft, a mounting removably secured to the drawbar for journalling said rockshaft for rotation about an axis extending transversely of the tractor, a second shaft perpendicular to the rockshaft and fixed thereto whereby said second shaft extends rearwardly in alignment with the longitudinal center of the tractor, a frame journalled on the second shaft for rotation about an axis extending longitudinally of the tractor, means on the second shaft for limiting longitudinal movement of the frame thereon, spaced rearwardly extending members on the frame adapted to be rigidly connected to an implement, spaced bell cranks pivotally mounted on the tractor, said bell cranks each having a lifting arm extending rearwardly from the tractor and substantially equally spaced from the longitudinal center thereof and a depending arm, flexible means connecting the lifting arms to the spaced rearwardly extending members of the frame adjacent the rear ends thereof, the journalled arrangement of the frame on the second shaft and flexible means connecting the lifting arms to the rearwardly extending members of the frame permitting the implement to follow the contour of the ground as it is drawn in trailing relation to the tractor, a bracket fixed on the tractor, and hydraulic power devices pivotally mounted on the bracket and having connection with the depending arms of the bell crank for raising the lifting arms and swinging the implement and frame upwardly about the rockshaft and reversibly operable to permit said implement and frame to lower by gravity.

2. A hitch adapted for attachment to a tractor having spaced lifting actuators as a unit for connecting an implement to the tractor comprising, a rockshaft, means adapted to be secured to the tractor for journalling said shaft for rotation about an axis extending transversely of the tractor, a second shaft perpendicular to the rockshaft and carried thereby whereby said second shaft extends rearwardly of the tractor, a frame journalled on the second shaft for rotation about an axis extending longitudinally of the tractor, spaced rearwardly extending members on the frame adapted to be rigidly connected to said implement, and flexible means adapted to connect the implement at spaced points to spaced lifting actuators on the tractor for swinging the implement and frame about the rockshaft, the journalled arrangement of the frame on the second shaft and flexible means connecting the implement to the lifting actuators permitting the implement to follow the contour of the ground as it is drawn in trailing relation to the tractor.

3. A hitch adapted for attachment to a tractor having a drawbar and spaced lifting actuators as a unit for connecting an implement to the tractor comprising, a rockshaft, a mounting adapted to be rigidly secured to the tractor drawbar for journalling said shaft for rotation about an axis extending transversely of the tractor, a second shaft perpendicular to the rockshaft and fixed thereto whereby said second shaft extends rearwardly in alignment with the longitudinal center of the tractor, a frame journalled on the second shaft for rotation about an axis extending longitudinally of the tractor, means on the second shaft for limiting longitudinal movement of the frame thereon, spaced rearwardly extending members on the frame adapted to be rigidly connected to said implement, and flexible means adapted to connect the implement at laterally spaced points to spaced lifting actuators on the tractor for swinging the implement and frame about the rockshaft, the journalled arrangement of the frame on the second shaft and flexible means connecting the implement to the lifting actuators permitting the implement to follow the contour of the ground as it is drawn in trailing relation to the tractor.

JOHN W. COX.
LEWIS M. COX.

References Cited in the file of this patent
UNITED STATES PATENTS

| Number | Name | Date |
|---|---|---|
| 1,429,048 | Schlagel | Sept. 12, 1922 |
| 1,688,615 | Daniel | Oct. 23, 1928 |
| 2,332,739 | Mott | Oct. 26, 1943 |
| 2,345,741 | Foulke, Jr. | Apr. 4, 1944 |
| 2,482,249 | Court | Sept. 20, 1949 |
| 2,518,215 | Wright | Aug. 8, 1950 |
| 2,518,363 | Orelind | Aug. 8, 1950 |
| 2,580,532 | Dugger | Jan. 1, 1952 |